United States Patent [19]

Vartanian

[11] Patent Number: 4,972,951
[45] Date of Patent: Nov. 27, 1990

[54] TRAY FOR VIDEO TAPE

[75] Inventor: Kachik Vartanian, Tujunga, Calif.

[73] Assignee: 501 U.S. Cosmo Plastics, Inc., Bell, Calif.

[21] Appl. No.: 522,904

[22] Filed: May 14, 1990

[51] Int. Cl.$^5$ .................. B65D 85/672; B65D 21/02
[52] U.S. Cl. .................................. 206/387; 206/518
[58] Field of Search .............. 206/387, 503, 505–507, 206/518–520

[56] References Cited

U.S. PATENT DOCUMENTS

| | | | |
|---|---|---|---|
| 2,599,727 | 6/1952 | Schmidt | 206/507 |
| 2,852,157 | 9/1958 | Frater | 206/507 |
| 2,994,457 | 8/1961 | Fornas | 206/520 |
| 2,995,271 | 8/1961 | Frater et al. | 206/507 |
| 3,027,045 | 3/1962 | Wilson | 206/505 |
| 3,052,373 | 9/1962 | Frater | 206/507 |
| 3,100,582 | 8/1963 | Lockwood | 206/507 |
| 3,620,367 | 11/1971 | Stembel | 206/387 |
| 3,638,827 | 2/1972 | Lau, Jr. et al. | 206/507 |
| 4,132,311 | 1/1979 | Glinert | 206/387 |
| 4,867,313 | 9/1989 | Padovani | 206/519 |

FOREIGN PATENT DOCUMENTS

| | | | |
|---|---|---|---|
| 0720690 | 11/1965 | Canada | 206/507 |
| 0723008 | 12/1965 | Canada | 206/507 |
| 1516176 | 3/1968 | France | 206/507 |
| 1062189 | 3/1967 | United Kingdom | 206/507 |
| 1462788 | 1/1977 | United Kingdom | 206/518 |
| 2104047 | 3/1983 | United Kingdom | 206/505 |

Primary Examiner—Jimmy G. Foster
Attorney, Agent, or Firm—Jack C. Munro

[57] ABSTRACT

A tray primarily designed to be used in conjunction with packaging of a video tape where the tray is constructed of thin sheet material and includes a central enlarged compartment within which the video tape is to be located in a close confining manner. Surrounding the compartment is an enclosing side wall which interiorly is hollow. Included within the enclosing side wall are ledges which are arranged so that a pair of trays can be stacked together and can be positioned in either a totally nested position or a partially nested position.

8 Claims, 1 Drawing Sheet

TRAY FOR VIDEO TAPE

BACKGROUND OF THE INVENTION

Video tapes are in extremely common use at the present time within the free world. Video tapes are to be usable in conjunction with a video recorder. Video recorders are getting to be a common household appliance. People are able to rent or purchase video tapes, take them home and play such on a video recorder. Also, video tapes can be utilized within the video recorder to record shows that are received by a television receiver. These shows are able to be recorded on a video tape even when the occupant of the household is not present and then played back at a later time.

It is common to support the video tape within a sheet material inexpensive tray which facilitates its packaging and transmittal to a retail outlet where the tape is sold. It is common for these trays to be placed in a nested condition thereby occupying a minimum amount of space during their transmittal to the manufacturing location. During the packaging of the tapes, it is common to remove the trays from their nested position prior to placing of a tape within each tray.

The nesting of these trays is so compact (snug) that it takes a few seconds of time for an individual to disassemble one tray from the group of nested trays. This few seconds in time, when multiplied by the number of trays that are packaged each and every day, amounts to a significant amount of time that is lost. Therefore, inherently, labor cost becomes a significant expense just to separate the nested trays.

It would be desirable to incorporate within video trays some structure that would facilitate their disassembly from the nested position so as to decrease the overall labor expense required in packaging of the trays prior to being distributed to the retail consumer outlet where the video tapes are sold to the consumer.

SUMMARY OF THE INVENTION

The structure of the present invention relates to a structural change incorporated within a conventional tray which is used to support a video tray in a package that is to be sold to the ultimate consumer. Generally, when the consumer removes the video tape from the tray, the tray is discarded. The tray includes an enclosing side wall which is to be used to encase the side wall of the video tape. Within that enclosing side wall there is incorporated a series of ledges When one tray is stacked onto another tray, it is these ledges which come into contact with the lower tray and support the two trays in a spaced apart manner. This spacing apart of the trays is to facilitate their disengagement from the stacked (nested) position.

DETAILED DESCRIPTION OF THE SHOWN EMBODIMENT

Figure 1:
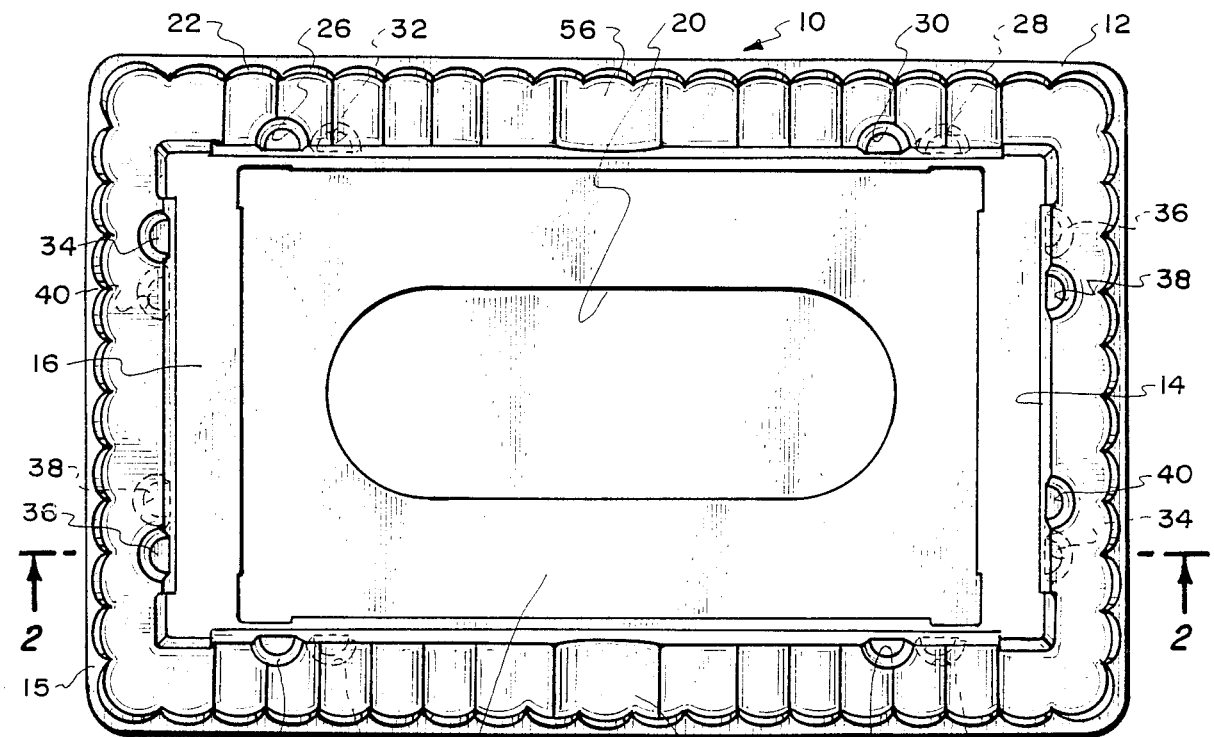
FIG. 1 is a top plan view of the tray of the present invention.

Referring particularly to the drawing, there is shown the tray 10 of this invention. Tray 10 is constructed totally of sheet material forming a housing 12. Housing 12 is basically rectangular in configuration when observed from the top or in plan view. Formed within the top surface of the housing 12 is a centrally located enlarged compartment 14. It is within this compartment 14 that there is to be located a video tape (not shown).

The outer lateral edge of the housing 12 includes a thin short flange 15. Flange 15 functions as a resting surface when locating of the tray 10 on a planar supportive surface (not shown). The bottom surface of compartment 14 defines a peripheral planar ledge 16. Inwardly of the ledge 16 there is located a stepped down surface 18. Substantially centrally located within the stepped down surface 18 is an elongated recess 20. The video tape which is to be located within the compartment 14 is to rest on the ledge 16. The reason for the stepped down configuration 18 and the recess 20 is so that additional space will be available for a specific type of video tape so that the tray 10 can accommodate the widest variety of different types of video tapes.

Surrounding the compartment 14 is an enclosing side wall 22. This enclosing side wale 22 is formed into a scalloped configuration. The reason for the scalloping configuration is to provide strength to make tray 10 substantially stronger than if the side wall 22 was constructed to be completely straight. Interiorly of the side wall 22 there is formed an enclosing recess 24 which is open to the bottom of the tray 10.

Formed within the side wall 22, and specifically within the wall surface defining exterior wall of compartment 14, are a plurality of indentations 26, 28, 30, 32, 34, 36, 38 and 40. Each of these indentations 26 through 40 are essentially identical in size and in configuration. Paying particular reference to FIG. 1 of the drawing, it can be seen that indentations 26 and 28 are in vertical alignment and indentations 30 and 32 are also in vertical alignment. However, it is to be noted that indentations 26 and 28 are spaced approximately one inch from the left edge of the tray 10 while indentations 30 and 32 are spaced approximately one and one-half inches from the right edge of the tray 10. Indentations 34 and 38 are not in horizontal alignment and indentations 36 and 40 are not in horizontal alignment. The reason for this will become apparent further on in the description.

It is to be noted that each of the indentations 26 through 40 has a circular back wall and are slightly tapered in a downward direction. The reason for this is to facilitate the removal of the tray from the mold used to manufacture the tray.

With respect to enclosing recess 24, the indentation 34 of each tray 10 defines a ledge 48. In a similar manner the indentation 36 defines a ledge 42, the indentation 38 defines a ledge 44, and indentation 40 defines a ledge 46. It is to be understood that indentations 26, 28, 30 and 32 also include ledges but these are not shown. All of the ledges for the indentations 26 through 40 are aligned in a single plane.

Figure 2:
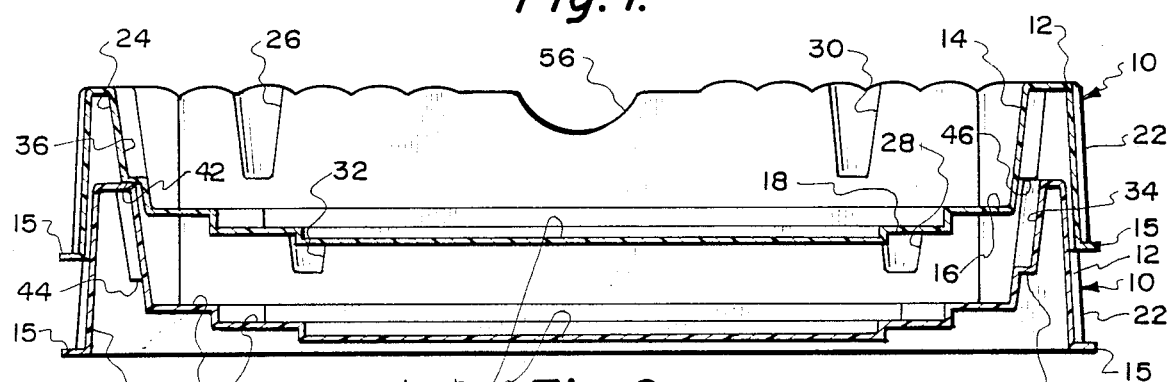
FIG. 2 is a cross-sectional view through the tray of the present invention taken along line 2-2 of FIG. 1 showing a pair of trays in the partially nested position.
Figure 3:
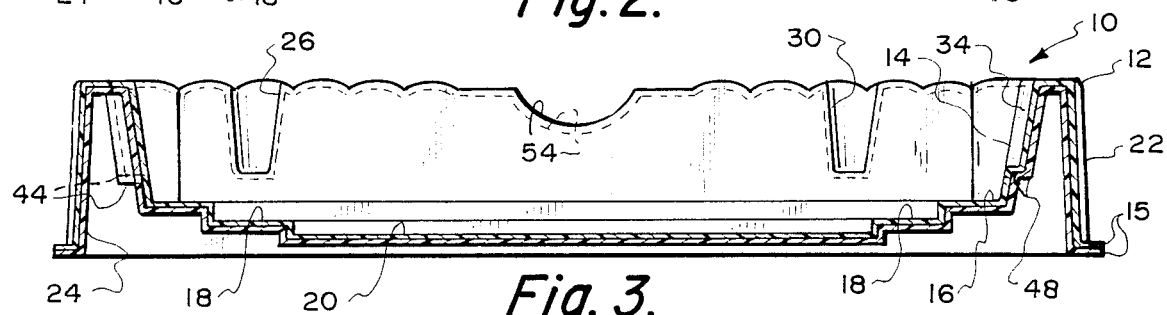
FIG. 3 is a view similar to FIG. 2 but showing the pair of trays in a totally nested position.

In observing of the two trays 10 that are shown in the drawing, the top tray 10 can be located as shown in FIG. 2, or the top tray 10 can be turned one hundred eighty degrees as shown in FIG. 3. When in the position of FIG. 2, the ledges, which include the ledges 42, 44, 46 and 48, rest directly onto the upper surface of the side wall 22. This is because, when in the position shown in FIG. 2, none of the indentations 26 through 40 coincide. When in this position, note that the recesses 20 are spaced about one-half inch apart. During the placing of a video tape within the compartment 14, this spacing apart of the trays 10 makes it quite easy to separate the trays 10 from the stacked (nested) position.

However, there is one disadvantage and that is, when the trays 10 are located in this spaced stacked relationship, the stacked series of trays 10 will occupy a significantly amount of more space when packaged. In FIG. 3, the position of the trays 10 is such that the indentations 26 through 40 do coincide and the entire top surface of the lower tray 10 abuts directly against the entire bottom surface of the top tray 10. However, when placing the trays 10 within a shipping container, locating of the trays in the spaced stacked relationship shown in FIG. 2 will result in the shipping container containing about one-third less trays when stacked according to FIG. 2 rather than as stacked according to FIG. 3. Therefore, any potential manufacturer, when selecting a shipment of the trays 10, may optionally select whether the trays 10 are to be located in the position of FIG. 2 or FIG. 3.

Formed within the top surface of the side wall 22 are a pair of depressions 54 and 56. It is the function of the depressions 54 and 56 to function as finger recesses to facilitate the removal of the video tape (not shown) which is located within the enlarged compartment 14.

Figure 4:
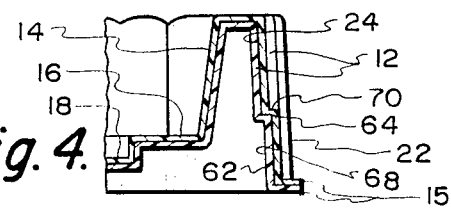
FIGS. 4 and 5 show different forms of structure other than that what is shown in FIGS. 1 to 3 which is to be usable to locate the trays in either the partially nested position or the totally nested position with this view showing only a portion of the side wall of a pair of the trays.

Referring particularly to FIG. 4, there is shown a modified form of the invention where the indentations are formed within the exterior wall surface of a side wall 22. These indentations are shown as indentation 62 formed within the bottom tray 10 and indentation 68 formed in the upper tray of the two stacks of trays. Indentation 62 forms a ledge 64 within indentation 68 forming a ledge 70. In FIG. 4, the two trays 10 are shown coinciding as in FIG. 3. However, when the two trays 10 are located in the spaced stacked relationship shown in FIG. 2, the ledges 70 will ride on the top surface of the side wall 22.

Figure 5:
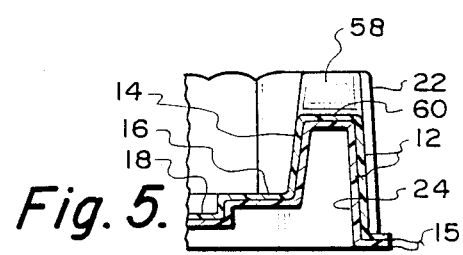

In reference to FIG. 5, there is shown a still further modified form of the invention in which there is included within the top surface of the side wall 22 indentations 58 and 60 with indentation 58 being shown in the top tray 10 of the stack of trays 10 and indentation 60 being formed within the lower tray 10 of the stack of trays. Again, in FIG. 5, the indentations 58 and 60 are shown coinciding. The indentations 58 and 60 are similar to depressions 54 and 56 with the exception that the indentations 58 and 60 are misaligned when the trays 10 are located in the position as shown in FIG. 2. This will cause the bottom surface of the indentation 58 to come into contact with the top surface of the side wall 22, again spacing the the trays in a spaced apart stacked relationship similar to that shown in FIG. 2.

What is claimed is:

1. A plurality of trays, each said tray for supporting a video tape, said trays comprising:

each said tray being formed of a thin sheet material housing having an upper surface and a bottom surface, said housing having a right end and a left end, said upper surface generally defining a tape confining compartment surrounded by an upstanding side wall, said side wall being hollow defining an open enclosing recess formed within said bottom surface;

a said tray to be stackably nested with another said tray with said side wall of one said tray to be located within a said enclosing recess of another said tray; and means for stacking said trays, said means optionally permitting said tray to be stacked in either a totally nested position or in a partially nested position, with said trays in said totally nested position said trays are connected together so said bottom surfaces abut and said trays occupy the absolute minimum amount of space, with said trays in said partially nested position said bottom surfaces are spaced apart and said tray occupy an amount of space significantly greater than said totally nested position.

2. The trays as defined in claim 1 wherein:
with said trays in said totally nested position said right ends of said trays being in juxtaposition and said left ends of said trays being in juxtaposition.

3. The trays as defined in claim 1 wherein:
with said trays in said partially nested position a said right end of a said tray is in juxtaposition with a left end of directly adjacent said trays.

4. The trays as defined in claim 1 wherein: said means comprising a plurality of indentations formed within said side wall, said side wall indentations being spaced apart, said indentations extending into said enclosing recess, each said indentation terminating in resting ledges, said resting ledges of a said tray which is stacked on top of another said tray to rest on said upper surface of said upstanding side wall of said another said tray.

5. The trays as defined in claim 4 wherein: at least one of said side wall indentations being located directly adjacent said right end, at least one of said indentations being located directly adjacent said left end, the distance of said indentation being from said right end being different than the distance of said indentation from said left end, said side wall defining an inner wall and an outer wall being separated and connected together by a top wall.

6. The trays as defined in claim 5 wherein:
said indentations being mounted within said inner wall.

7. The trays as defined in claim 5 wherein: said indentations being formed within said top wall.

8. The trays as defined in claim 5 wherein: said indentations being formed within said outer wall.

* * * * *